Patented Nov. 18, 1930

1,781,859

UNITED STATES PATENT OFFICE

JAMES B. PIERCE, JR., OF CHARLESTON, WEST VIRGINIA, ASSIGNOR TO BARIUM REDUCTION CORPORATION, OF CHARLESTON, WEST VIRGINIA, A CORPORATION OF DELAWARE

METHOD OF MAKING HYDROGEN PEROXIDE

No Drawing.  Application filed December 14, 1927. Serial No. 240,081.

This invention relates to a method of making hydrogen peroxide.

I have discovered that a pure and stable hydrogen peroxide can be made from strontium peroxide and sulphuric acid and that the process may be more easily and rapidly carried out if a small quantity of an acid capable of forming a soluble strontium salt is added to the sulphuric acid. Various acids may be employed for this purpose such as hydrochloric, hydrofluoric, nitric and phosphoric acid.

In the manufacture of hydrogen peroxide, barium peroxide and sulphuric acid have been employed. Strontium peroxide possesses the great advantage over barium peroxide in that it contains about fifty percent more available oxygen. It is also more soluble in water and thus requires less acid capable of forming a soluble strontium salt, such as hydrochloride, hydrofluoric, nitric or phosphoric acid. In addition, strontium peroxide reacts quicker with sulphuric acid than barium peroxide and the strontium sulphate formed, while insoluble in water, is much more soluble than barium sulphate, and the strontium sulphate does not form an insoluble coating about the strontium peroxide such as occurs when barium peroxide is used and barium sulphate produced in the reaction. At the same time, the strontium sulphate is not so soluble in water as to prevent the manufacture of U. S. P. $H_2O_2$.

Furthermore, strontium salts are non-poisonous whereas the barium salts are very toxic. A small amount of soluble strontium salt in the product is therefore not objectionable whereas U. S. P. $H_2O_2$ must be free of barium.

The manufacture of hydrogen peroxide from alkali metal peroxides has also been proposed, but this process is open to the disadvantage that soluble salts are left in the hydrogen peroxide. Thus, when hydrogen peroxide is prepared from sodium peroxide, the product contains soluble sodium salts which must be removed by distillation or ether extraction to obtain pure hydrogen peroxide. When hydrogen peroxide is formed from strontium peroxide, no soluble salts remain in the product.

In a typical embodiment of my invention strontium peroxide, preferably ninety percent pure or over, is thoroughly hydrated by mixing it with water to form a thick paste. The strontium peroxide may be obtained from any source, provided it possesses the necessary purity, but I have found that strontium peroxide prepared according to my United States Patent No. 1,325,043 is particularly suitable. The paste formed by the hydration of the strontium peroxide is then slowly added to a weak solution of pure sulphuric acid containing a small amount of an acid capable of forming a soluble strontium salt. For this purpose I preferably employ either hydrochloric acid, hydrofluoric acid, nitric acid or phosphoric acid and I have found that such acid may be used in a very small amount, say 1/100 to 1/500 of the amount of sulphuric acid present. Any of these acids may be employed for the purpose of reacting with the strontium peroxide to form hydrogen peroxide and a soluble strontium salt, which salt in turn reacts with the sulphuric acid to form strontium sulphate and replenish the other acid. The mixture is stirred vigorously and cooled by ice or otherwise until all of the strontium peroxide and acid have reacted. The acid and strontium peroxide are used in equimolecular proportions. The strength of the acid solution is regulated to obtain hydrogen peroxide of the desired strength.

Strontium peroxide and sulphuric acid will react alone to form hydrogen peroxide and strontium sulphate, but difficulty is experienced in getting the reaction to go to completion and it is considerably slower than if one of the other mentioned acids is added to the solution. By adding a small quantity of an acid capable of forming a soluble strontium salt, the strontium peroxide reacts with it to form the corresponding strontium salt, such as strontium nitrate, which salt in turn reacts with the sulphuric acid to form strontium sulphate. The second reaction replaces the nitric or other acid so that there is always present sufficient of the second acid to react with the remaining strontium peroxide and a very small quantity of such acid is thus sufficient to materially hasten the reaction. Where the presence of a soluble strontium salt in the product is not a disadvantage, one of the acids mentioned, such as hydrochloric acid, can be used alone.

I claim:

1. The herein described process consisting essentially of adding strontium peroxide to a solution of a mixture of acids one of which forms a relatively insoluble strontium salt and the other of which forms a relatively soluble strontium salt, the second acid being present in a small amount, to form a relatively insoluble strontium salt and hydrogen peroxide.

2. The herein described process consisting essentially of adding strontium peroxide to a solution of sulphuric acid containing a minute quantity of an acid that forms a relatively soluble strontium salt to form an insoluble strontium salt and hydrogen peroxide.

3. The herein described process consisting essentially of adding strontium peroxide to a solution of sulphuric acid containing a minute quantity of nitric acid.

4. The herein described process consisting essentially of hydrating strontium peroxide to form a thick paste, slowly adding the paste to a weak solution of an acid capable of forming an insoluble strontium salt containing a small amount of acid capable of forming a soluble strontium salt and stirring the mixture during the reaction.

5. The herein described process consisting essentially of hydrating strontium peroxide to form a thick paste, slowly adding the paste to a weak solution of sulphuric acid containing a minute quantity of nitric acid, and stirring the mixture during the reaction.

In testimony whereof I affix my signature.

JAMES B. PIERCE, Jr.